(12) United States Patent
Ho et al.

(10) Patent No.: US 11,675,119 B1
(45) Date of Patent: Jun. 13, 2023

(54) BACKLIGHT ASSEMBLY AND TOUCHPAD DEVICE

(71) Applicant: Chicony Power Technology Co., Ltd., New Taipei (TW)

(72) Inventors: Hsuan-Wei Ho, New Taipei (TW); Chen-Hao Chiu, New Taipei (TW)

(73) Assignee: Chicony Power Technology Co., Ltd., New Taipei (TW)

( * ) Notice: Subject to any disclaimer, the term of this patent is extended or adjusted under 35 U.S.C. 154(b) by 0 days.

(21) Appl. No.: 17/817,652

(22) Filed: Aug. 4, 2022

(30) Foreign Application Priority Data

Jun. 16, 2022 (TW) .................................. 11112250.6

(51) Int. Cl.
*G02B 6/00* (2006.01)
*F21V 8/00* (2006.01)
*G06F 3/041* (2006.01)

(52) U.S. Cl.
CPC ........... *G02B 6/0055* (2013.01); *G02B 6/004* (2013.01); *G02B 6/006* (2013.01); *G02B 6/0068* (2013.01); *G02B 6/0081* (2013.01); *G06F 3/041* (2013.01)

(58) Field of Classification Search
CPC ...... G02B 6/0055; G02B 6/004; G02B 6/006; G02B 6/0068; G02B 6/0081; G06F 3/041; H01H 9/161; H01H 9/182; H01H 2009/183
See application file for complete search history.

(56) References Cited

U.S. PATENT DOCUMENTS

| | | | |
|---|---|---|---|
| 9,887,052 B1 * | 2/2018 | Lin ..................... | G02B 6/0078 |
| 2009/0183976 A1 * | 7/2009 | Chang .................... | H01H 13/83 |
| | | | 200/314 |
| 2010/0097246 A1 * | 4/2010 | Watanabe et al. ..... | H01H 13/83 |
| | | | 341/22 |
| 2014/0326589 A1 * | 11/2014 | Shiu ..................... | H01H 13/023 |
| | | | 200/314 |

FOREIGN PATENT DOCUMENTS

| | | |
|---|---|---|
| CN | 204329091 U | 5/2015 |
| CN | 204390647 U | 6/2015 |
| TW | M412410 U1 | 9/2011 |
| TW | 202036244 A | 10/2020 |
| TW | I732663 B | 7/2021 |

\* cited by examiner

*Primary Examiner* — Y M. Quach Lee
(74) *Attorney, Agent, or Firm* — CKC & Partners Co., LLC

(57) ABSTRACT

A backlight assembly includes a reflection sheet, a light-shielding sheet, two light-emitting elements, and a light guide plate. The reflection sheet is disposed on a circuit board and has two through holes. The light-shielding sheet is disposed on the reflection sheet and has a hollow portion having a closed contour. The light-emitting elements are disposed on the circuit board, respectively accommodated in the through holes, and located in the hollow portion. The light guide plate is embedded in the hollow portion and includes two light guide regions. Each of the light guide regions has a light mixing region and a light outputting region. A corresponding one of the light-emitting elements and the light outputting region are respectively located on opposite sides of the first light mixing region. The light-shielding sheet further has a light blocking portion disposed between the light guide regions.

12 Claims, 6 Drawing Sheets

BACKLIGHT ASSEMBLY AND TOUCHPAD DEVICE

CROSS-REFERENCE TO RELATED APPLICATION

This application claims priority to Taiwan Application Serial Number 111122506, filed Jun. 16, 2022, which is herein incorporated by reference.

BACKGROUND

Technical Field

The present disclosure relates to a backlight assembly, and more particularly, to a backlight assembly used in a touchpad device.

Description of Related Art

The appearances of traditional touchpad devices are usually monotonous and dull, so computer peripheral manufacturers have developed illuminated touchpad devices with excellent visual effects. The backlight assemblies used in the traditional touchpad devices are composed of two parts, which are the light-shielding layer and light guide plate from top to bottom.

As the number of functions continues to increase, so does the markings on the touchpad device. If these button icons only share the same light guide plate, a single button icon cannot be displayed or marked independently. In order to enable each button icon on the touchpad device to emit light independently, generally, a light source needs to be disposed directly below each button icon, which belongs to the design of direct Illumination-type. However, the design of direct Illumination-type requires a fixed light mixing distance to produce uniform light. However, the light mixing distance cannot reduce the thickness of the touchpad device and reduce the sensitivity of the touch sensor.

Accordingly, how to provide a backlight assembly to solve the aforementioned problems becomes an important issue to be solved by those in the industry.

SUMMARY

An aspect of the disclosure is to provide a backlight assembly that can efficiently solve the aforementioned problems.

According to an embodiment of the disclosure, a backlight assembly includes a reflection sheet, a light-shielding sheet, a first light-emitting element, a second light-emitting element, and a light guide plate. The reflection sheet is disposed on a circuit board and has a first through hole and a second through hole. The light-shielding sheet is disposed on the reflection sheet and has a hollow portion. The hollow portion has a closed contour. The first light-emitting element and the second light-emitting element are disposed on the circuit board, respectively accommodated in the first through hole and the second through hole, and located in the hollow portion. The light guide plate is embedded in the hollow portion and includes a first light guide region and a second light guide region. The first light guide region has a first light mixing region and a first light outputting region. The first light-emitting element and the first light outputting region are respectively located on opposite sides of the first light mixing region. The second light guide region has a second light mixing region and a second light outputting region. The second light-emitting element and the second light outputting region are respectively located on opposite sides of the second light mixing region. The light-shielding sheet further has a light blocking portion disposed between the first light guide region and the second light guide region.

In an embodiment of the disclosure, the first light outputting region and the second light outputting region respectively have a first light guide pattern and a second light guide pattern formed by a plurality of microstructures.

In an embodiment of the disclosure, the backlight assembly further includes a cover plate disposed above the light guide plate and the light-shielding sheet. A reflective layer is provided on a side of the cover plate facing the light guide plate. The cover plate further has a first pattern and a second pattern that are light transmissive and respectively correspond to the first light guide pattern and the second light guide pattern vertically.

In an embodiment of the disclosure, a thickness of the light-shielding sheet is greater than a thickness of the light guide plate, a height of the first light-emitting element, and a height of the second light-emitting element.

In an embodiment of the disclosure, at least one of the first light-emitting element and the second light-emitting element is disposed on a wall surface of the hollow portion, and is configured to emit light toward the light blocking portion.

In an embodiment of the disclosure, at least one of the first light-emitting element and the second light-emitting element is disposed on a wall surface of the light blocking portion, and is configured to emit light away from the light blocking portion.

In an embodiment of the disclosure, the light guide plate has a connecting portion. Two ends of the connecting portion are respectively connected to the first light guide region and the second light guide region.

In an embodiment of the disclosure, the connecting portion has a bent portion.

In an embodiment of the disclosure, the connecting portion has a zigzag shape.

In an embodiment of the disclosure, the connecting portion is U-shaped.

In an embodiment of the disclosure, a light outputting surface of the first light-emitting element has a first width. The first light mixing region is a portion within a first distance from a light incident surface of the first light guide region. The first distance is at least about 1.5 times the first width.

In an embodiment of the disclosure, a light outputting surface of the second light-emitting element has a second width. The second light mixing region is a portion within a second distance from a light incident surface of the second light guide region. The second distance is at least about 1.5 times the second width.

In an embodiment of the disclosure, the first light mixing region is defined by an overlapping region of an orthographic projection of the reflective layer projected on the first light guide region.

In an embodiment of the disclosure, the second light mixing region is defined by an overlapping region of an orthographic projection of the reflective layer projected on the second light guide region.

According to an embodiment of the disclosure, a touchpad device includes a circuit board and a backlight assembly. The backlight assembly includes a reflection sheet, a light-shielding sheet, a first light-emitting element, a second light-emitting element, and light guide plate. The reflection sheet is disposed on the circuit board and has a first through hole and a second through hole. The light-shielding sheet is disposed on the reflection sheet and has a hollow portion. The hollow portion has a closed contour. The first light-emitting element and the second light-emitting element are disposed on the circuit board, respectively accommodated in the first through hole and the second through hole, and located in the hollow portion. The light guide plate is embedded in the hollow portion and includes a first light guide region and a second light guide region. The first light guide region has a first light mixing region and a first light outputting region. The first light-emitting element and the first light outputting region are respectively located on opposite sides of the first light mixing region. The second light guide region has a second light mixing region and a second light outputting region. The second light-emitting element and the second light outputting region are respectively located on opposite sides of the second light mixing region. The light-shielding sheet further has a light blocking portion disposed between the first light guide region and the second light guide region.

Accordingly, in the backlight assembly of the present disclosure, the first light-emitting element and the second light-emitting element emit light toward the first light guide region and the second light guide region of the light guide plate, respectively. Moreover, the light guide plate is embedded in the hollow portion of the light-shielding sheet, and the light blocking portion of the light-shielding sheet is disposed between the first light guide region and the second light guide region. In this way, the light blocking portion of the light-shielding sheet can isolate the light emitted by the first light-emitting element and the second light-emitting element without interfering with each other, so that the first pattern and the second pattern on the cover plate can be displayed independently. In some embodiments, at least one of the first light-emitting element and the second light-emitting element is disposed on the wall surface of the hollow portion and configured to emit light toward the light blocking portion, or disposed on the wall surface of the light blocking portion and configured to emit light away from the light blocking portion. In some embodiments, the light guide plate has a connecting portion with two ends respectively connected to the first light guide region and the second light guide region, and the connecting portion has a bent portion. In this way, the light emitted by the first light-emitting element needs to go through more than two turns before reaching the second light guide region, or the light emitted by the second light-emitting element needs to go through more than two turns before reaching the first light guide region, thereby ensuring that the light emitted by the first light-emitting element and the second light-emitting element do not interfere with each other. Moreover, compared with separated light guide blocks, connecting the first light guide region and the second light guide region by the connecting portion as disclosed in the present embodiment can facilitate the assembly and alignment of the light guide plate.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
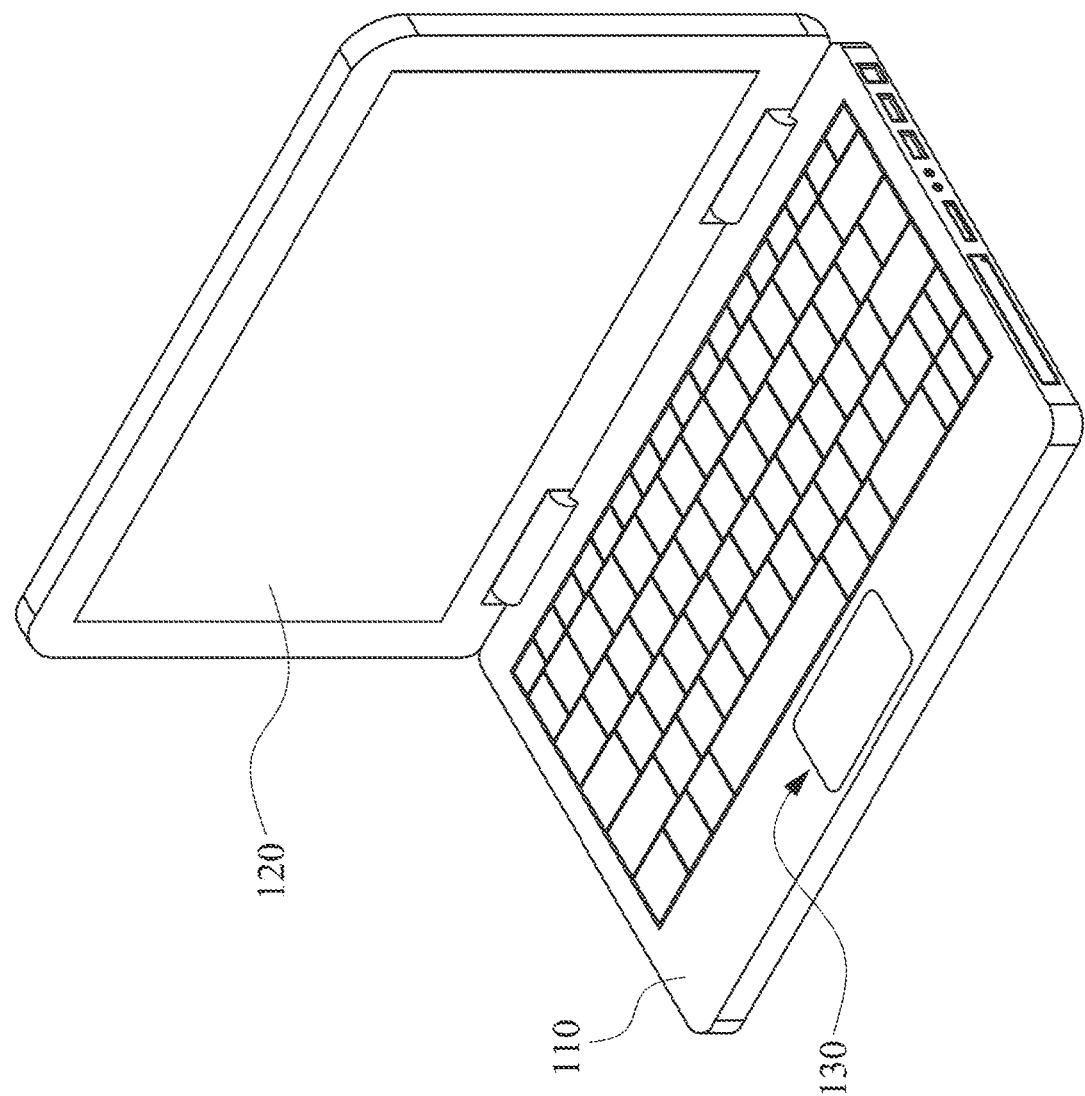
FIG. 1 is a perspective view of an electronic device according to an embodiment of the disclosure.

Reference will now be made in detail to the present embodiments of the disclosure, examples of which are illustrated in the accompanying drawings. Wherever possible, the same reference numbers are used in the drawings and the description to refer to the same or like parts. However, specific structural and functional details disclosed herein are merely representative for purposes of describing example embodiments, and thus may be embodied in many alternate forms and should not be construed as limited to only example embodiments set forth herein. Therefore, it should be understood that there is no intent to limit example embodiments to the particular forms disclosed, but on the contrary, example embodiments are to cover all modifications, equivalents, and alternatives falling within the scope of the disclosure.

Reference is made to FIG. 1. FIG. 1 is a perspective view of an electronic device 100 according to an embodiment of the disclosure. As shown in FIG. 1, in the present embodiment, the electronic device 100 includes a host 110, a display 120, and a touchpad device. The touchpad device is an input device disposed in the host 110, but the present disclosure is not limited in this regard. In practical applications, the touchpad device can also be an electronic product (e.g., a personal digital assistant, a keyboard including a touchpad, etc.) using a touchpad as an input or operation interface. That is, concepts of the electronic device 100 of the present disclosure may be applied to any electronic product using a touchpad as an input or operation interface. The structures and functions of some elements included in the touchpad device and the connections and operation relationships among these elements will be described in detail below.

Figure 2:
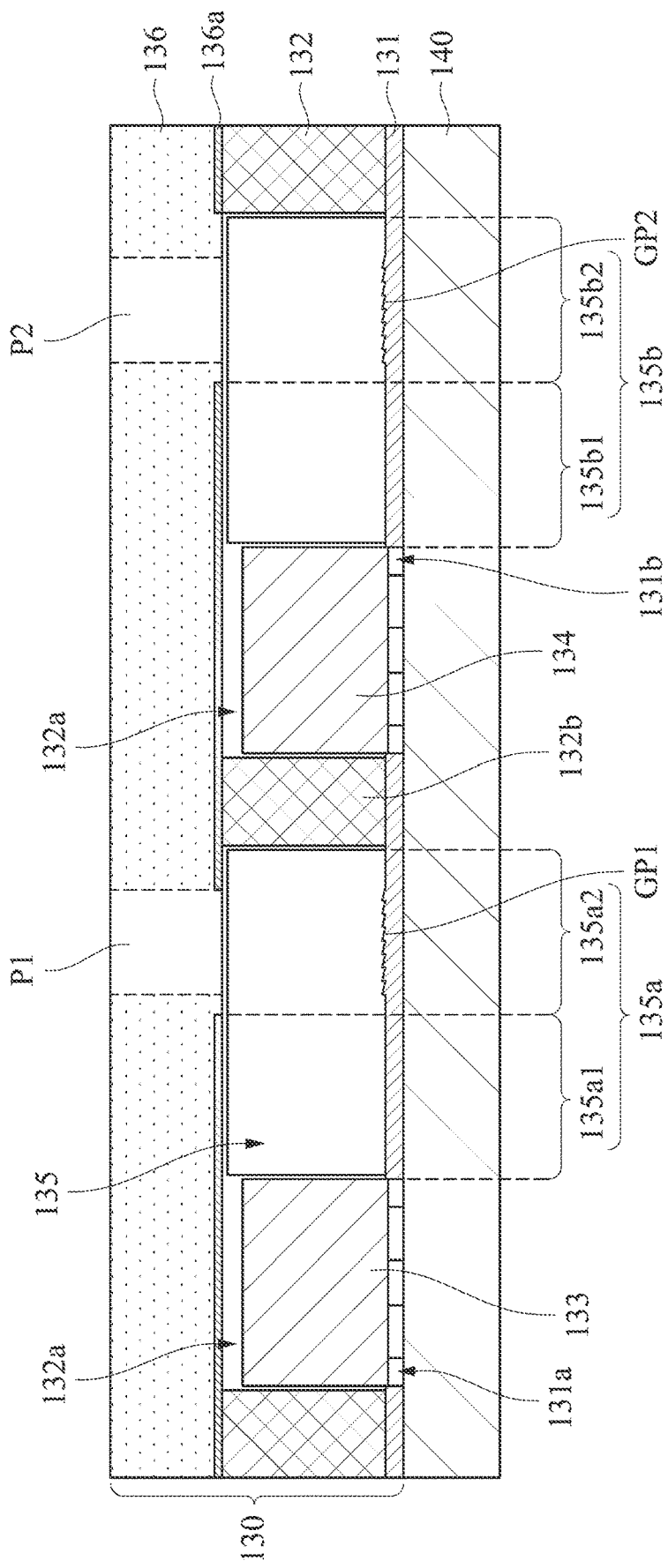
FIG. 2 is a schematic cross-sectional view of a backlight assembly and a circuit board according to an embodiment of the disclosure.
Figure 3:
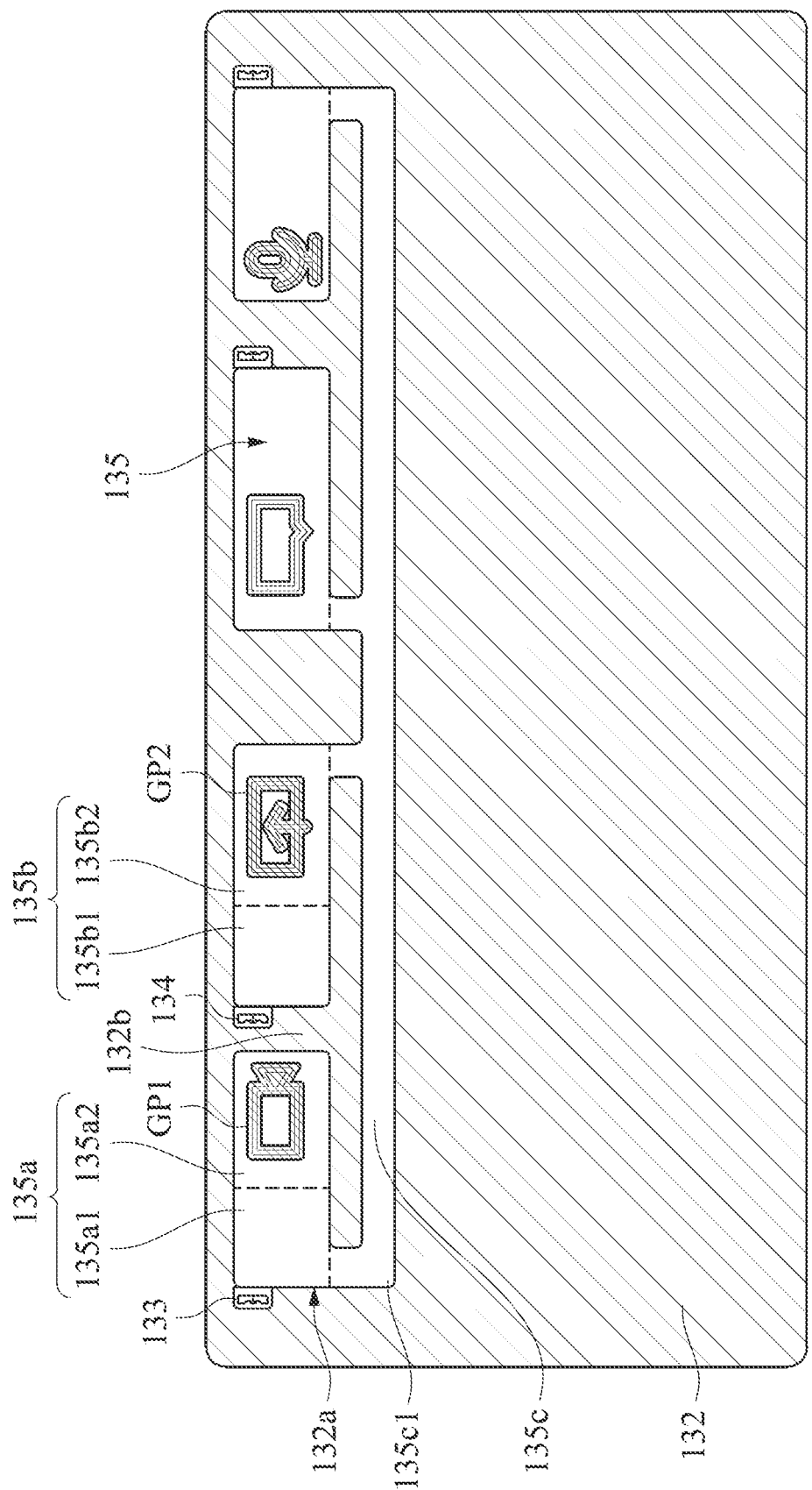
FIG. 3 is a front view of a light-shielding sheet and a light guide plate according to an embodiment of the disclosure.

Reference is made to FIGS. 2 and 3. FIG. 2 is a schematic cross-sectional view of a backlight assembly 130 and a circuit board 140 according to an embodiment of the disclosure. FIG. 3 is a front view of a light-shielding sheet 132 and a light guide plate 135 according to an embodiment of the disclosure. As shown in FIGS. 2 and 3, in the present embodiment, the touchpad device is disposed in the host 110 and includes the backlight assembly 130 and the circuit board 140. The backlight assembly 130 is exposed by an opening of the housing of the host 110. The circuit board 140 may include touch circuits. The backlight assembly 130 includes a reflection sheet 131, a light-shielding sheet 132, a first light-emitting element 133, a second light-emitting element 134, and a light guide plate 135. The reflection sheet 131 is disposed on the circuit board 140 and has a first through hole 131*a* and a second through hole 131*b*. The light-shielding sheet 132 is disposed on the reflection sheet 131 and has a hollow portion 132*a*. The hollow portion 132*a* has a closed contour. The first light-emitting element 133 and the second light-emitting element 134 are disposed on the circuit board 140, respectively accommodated in the first through hole 131a and the second through hole 131b of the reflection sheet 131, and located in the hollow portion 132a. The light guide plate 135 is embedded in the hollow portion 132a. The first light-emitting element 133 and the second light-emitting element 134 are configured to laterally emit light toward the light guide plate 135. Since the light guide plate 135 is embedded in the hollow portion 132a with a closed contour (meaning that the light-shielding sheet 132 completely surrounds the outer edge of the light guide plate 135), the light transmitted in the light guide plate 135 will be blocked by the light-shielding sheet 132 without leaking when reaching the outer edge of the light guide plate 135. Since the bottom of the light guide plate 135 is provided with the reflection sheet 131, it can be ensured that the light transmitted in the light guide plate 135 is only outputted from the top surface of the light guide plate 135.

As shown in FIG. 2, in the present embodiment, a thickness of the light-shielding sheet 132 is greater than a thickness of the light guide plate 135, a height of the first light-emitting element 133, and a height of the second light-emitting element 134. In this way, the light transmitted in the light guide plate 135 can be further prevented from laterally leaking.

In detail, the light guide plate 135 includes a first light guide region 135a and a second light guide region 135b. The first light guide region 135a has a first light mixing region 135a1 and a first light outputting region 135a2. The first light-emitting element 133 and the first light outputting region 135a2 are respectively located on opposite sides of the first light mixing region 135a1 laterally. The second light guide region 135b has a second light mixing region 135b1 and a second light outputting region 135b2. The second light-emitting element 134 and the second light outputting region 135b2 are respectively located on opposite sides of the second light mixing region 135b1 laterally. In this way, the light emitted by the first light-emitting element 133 can be uniformly mixed in the first light mixing region 135a1, and then transmitted to the first light outputting region 135a2 for light outputting. Similarly, the light emitted by the second light-emitting element 134 can be uniformly mixed in the second light mixing region 135b1, and then transmitted to the second light outputting region 135b2 for light outputting. It should be noted here that the hot spot is the brightest region in front of the light source (such as a light-emitting diode). When it appears on the light incident surface of the light guide plate, there will be obvious bright lines or bright arcs, resulting in obvious uneven brightness of the overall light effect. Therefore, in this embodiment, the light emitted by the first light-emitting element 133 and the second light-emitting element 134 are subjected to multiple total reflections in the first light mixing region 135a1 and the second light mixing region 135b1 respectively, so that the light mixing effect can be achieved.

As shown in FIG. 2, in the present embodiment, the first light outputting region 135a2 and the second light outputting region 135b2 respectively have a first light guide pattern GP1 and a second light guide pattern GP2 formed by a plurality of microstructures. In addition, the backlight assembly 130 further includes a cover plate 136 disposed above the light guide plate 135 and the light-shielding sheet 132. A reflective layer 136a is provided on a side of the cover plate 136 facing the light guide plate 135. The reflective layer 136a vertically corresponds to the first light-emitting element 133, the second light-emitting element 134, and part of the light guide plate 135, and is used to reflect the upward scattered light back to the light guide plate 135, thereby increasing the utilization rate of light. The cover plate 136 further has a first pattern P1 and a second pattern P2 that are light transmissive and respectively correspond to the first light guide pattern GP1 and the second light guide pattern GP2 vertically. With these structural configurations, the light transmitted to the first light outputting region 135a2 will be reflected upward by the first light guide pattern GP1, and then pass through the first pattern P1 of the cover plate 136 to leave the cover plate 136, so that the user can clearly identify the first pattern P1 that is illuminated. Similarly, the light transmitted to the second light outputting region 135b2 will be reflected upward by the second light guide pattern GP2, and then pass through the second pattern P2 of the cover plate 136 to leave the cover plate 136, so that the user can clearly identify the second pattern P2 that is illuminated. In some embodiments, on the side of the cover plate 136 facing the light guide plate 135, the reflective layer 136a covers the area except the first pattern P1 and the second pattern P2 to increase the convenience of the process.

In some embodiments, the first light mixing region 135a1 is defined by the overlapping region of the orthographic projection of the reflective layer 136a projected on the first light guide region 135a, but the present disclosure is not limited in this regard. In some embodiments, the second light mixing region 135b1 is defined by the overlapping region of the orthographic projection of the reflective layer 136a projected on the second light guide region 135b, but the present disclosure is not limited in this regard.

Figure 4:
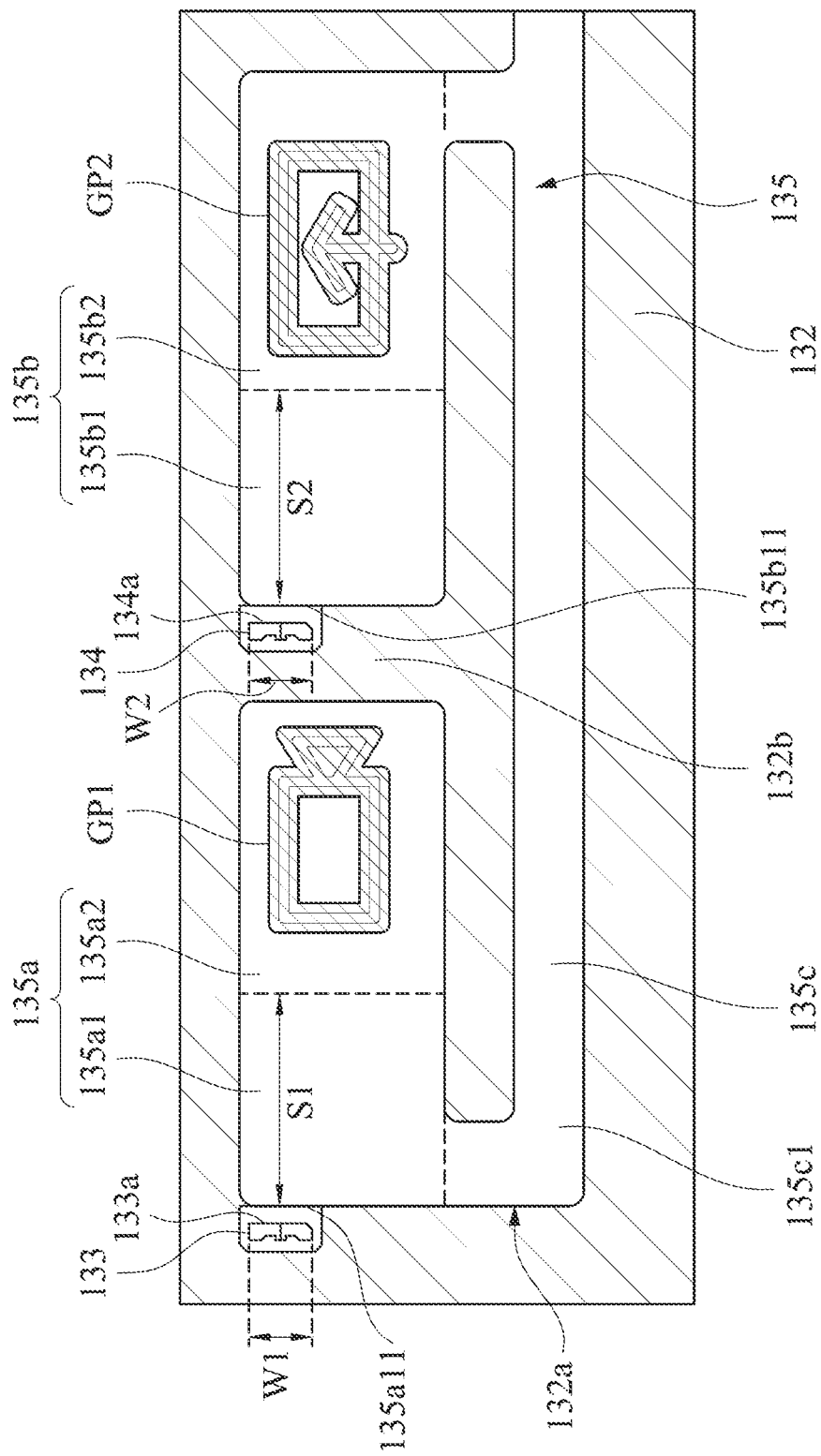
FIG. 4 is a partial enlarged view of the structure in FIG. 3.

Reference is made to FIG. 4. FIG. 4 is a partial enlarged view of the structure in FIG. 3. As shown in FIG. 4, in the present embodiment, a light outputting surface 133a of the first light-emitting element 133 has a first width W1. The first light mixing region 135a1 is a portion within a first distance S1 from a light incident surface 135a11 of the first light guide region 135a. The first distance S1 is at least about 1.5 times the first width W1. In this way, the light emitted by the first light-emitting element 133 can be sufficiently uniformly mixed in the first light mixing region 135a1.

As shown in FIG. 4, in the present embodiment, a light outputting surface 134a of the second light-emitting element 134 has a second width W2. The second light mixing region 135b1 is a portion within a second distance S2 from a light incident surface 135b11 of the second light guide region 135b. The second distance S2 is at least about 1.5 times the second width W2. In this way, the light emitted by the second light-emitting element 134 can be sufficiently uniformly mixed in the second light mixing region 135b1.

In practical applications, as shown in FIG. 3, the backlight assembly 130 may further equipped with more or less number of light-emitting elements, and the light guide plate 135 may further include more or less number of light guide regions to correspond to the light-emitting elements respectively.

As shown in FIGS. 2 and 3, in the present embodiment, the light-shielding sheet 132 further has a light blocking portion 132b. The light blocking portion 132b laterally protrudes from the wall surface of the hollow portion 132a of the light-shielding sheet 132, and is disposed between the first light guide region 135a and the second light guide region 135b. In this way, the light blocking portion 132b of the light-shielding sheet 132 can isolate the light emitted by the first light-emitting element 133 and the second light-emitting element 134 without interfering with each other, so that the first pattern P1 and the second pattern P2 on the cover plate 136 can be displayed independently.

As shown in FIGS. 2 and 3, in the present embodiment, the first light-emitting element 133 is disposed on the wall surface of the hollow portion 132a, and is configured to emit light toward the light blocking portion 132b. In this way, the light emitted by the first light-emitting element 133 needs to go through more than two turns (e.g., via a connecting portion 135c with a bent portion 135c1 shown in FIGS. 3 and 4 and described below) before reaching the second light guide region 135b (i.e., the light emitted by the first light-emitting element 133 will not cause the second pattern P2 of the cover plate 136 to output light), thereby ensuring that the light emitted by the first light-emitting element 133 and the second light-emitting element 134 do not interfere with each other.

As shown in FIGS. 2 and 3, in the present embodiment, the second light-emitting element 134 is disposed on a wall surface of the light blocking portion 132b, and is configured to emit light away from the light blocking portion 132b. In this way, the light emitted by the second light-emitting element 134 needs to go through more than two turns (e.g., via the connecting portion 135c with the bent portion 135c1 shown in FIGS. 3 and 4 and described below) before reaching the first light guide region 135a (i.e., the light emitted by the second light-emitting element 134 will not cause the first pattern P1 of the cover plate 136 to output light), thereby ensuring that the light emitted by the first light-emitting element 133 and the second light-emitting element 134 do not interfere with each other.

In practical applications, the light-emitting elements can be flexibly disposed on the wall surface of the hollow portion 132a or the wall surface of the light blocking portion 132b, and do not limited to the embodiment shown in FIGS. 2 and 3.

As shown in FIGS. 3 and 4, in the present embodiment, the light guide plate 135 has the connecting portion 135c. Two ends of the connecting portion 135c are respectively connected to the first light guide region 135a and the second light guide region 135b. Compared with separated light guide blocks, connecting the first light guide region 135a and the second light guide region 135b by the connecting portion 135c as disclosed in the present embodiment can facilitate the assembly and alignment of the light guide plate 135.

Specifically, the connection portion 135c has the bent portion 135c1. In this way, it is possible to further increase the difficulty that the light emitted by the first light-emitting element 133 and the light emitted by the second light-emitting element 134 interfere with each other.

As shown in FIGS. 3 and 4, in the present embodiment, the connecting portion 135c with the bent portion 135c1 is U-shaped, but the present disclosure is not limited in this regard.

Figure 5:
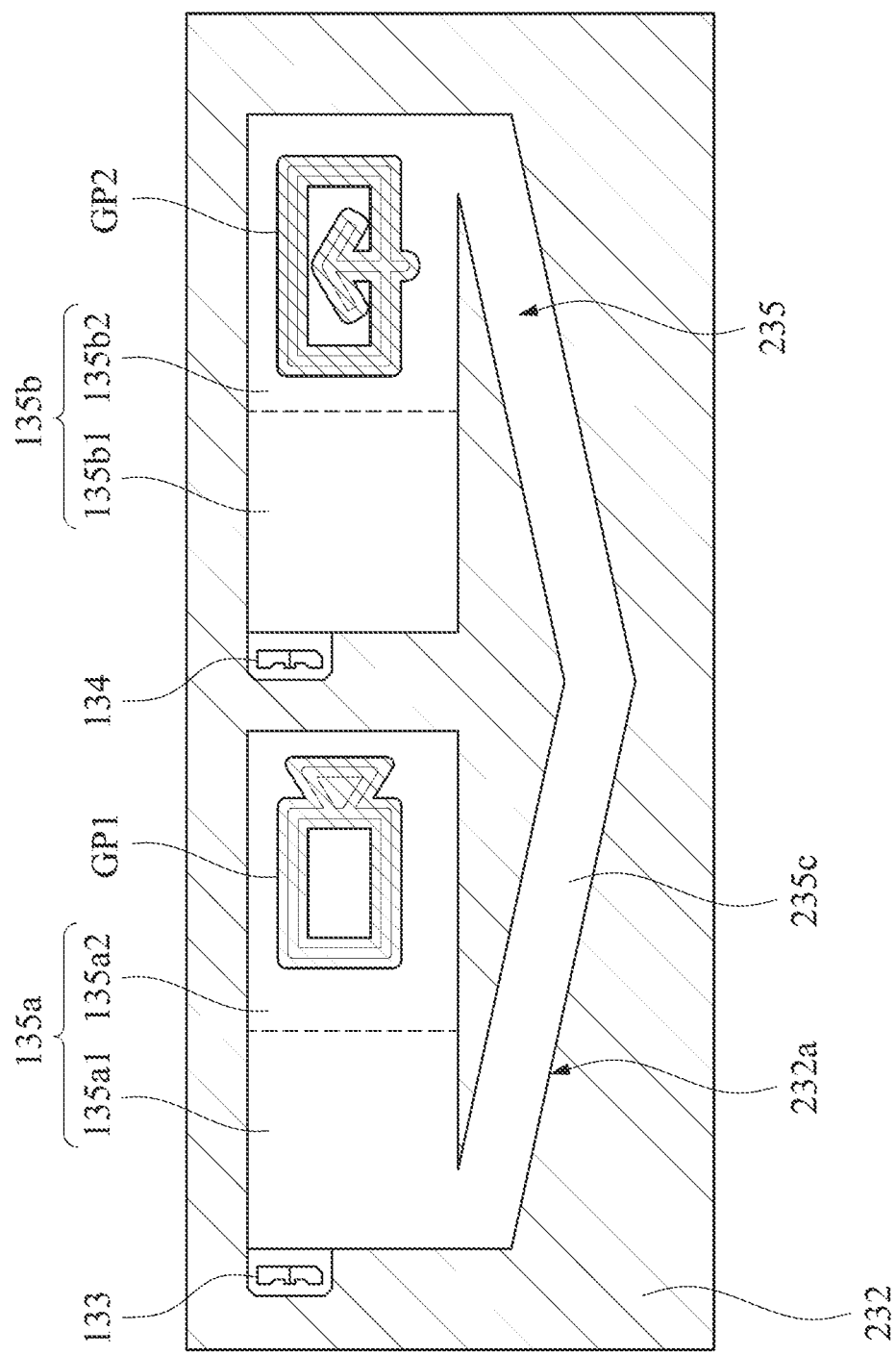
FIG. 5 is a partial enlarged view of a light-shielding sheet and a light guide plate according to another embodiment of the disclosure.

Reference is made to FIG. 5. FIG. 5 is a partial enlarged view of a light-shielding sheet 232 and a light guide plate 235 according to another embodiment of the disclosure. As shown in FIG. 5, in the present embodiment, the light-shielding sheet 232 has a hollow portion 232a. The hollow portion 232a has a closed contour. The light guide plate 235 is embedded in the hollow portion 232a. The light guide plate 235 includes a first light guide region 135a, a second light guide region 135b, and a connecting portion 235c, in which the first light guide region 135a and the second light guide region 135b are the same as or similar to those of the embodiment shown in FIG. 3, so reference can be made to the above related descriptions and will not be repeated here. A difference between the present embodiment and the embodiment shown in FIG. 3 is that the connecting portion 235c of the present embodiment is V-shaped, so the difficulty of mutual interference between the light emitted by the first light-emitting element 133 and the light emitted by the second light-emitting element 134 can also be increased.

In practical applications, the connecting portions 135c may be arranged between the first light guide region 135a and the second light guide region 135b and have a zigzag shape, which is not drawn.

As shown in FIG. 3, in the present embodiment, the width of the connecting portion 135c is smaller than the width of the first light guide region 135a and the width of the second light guide region 135b (e.g., the widths in the vertical direction in FIG. 3), but the present disclosure is not limited in this regard.

Figure 6:
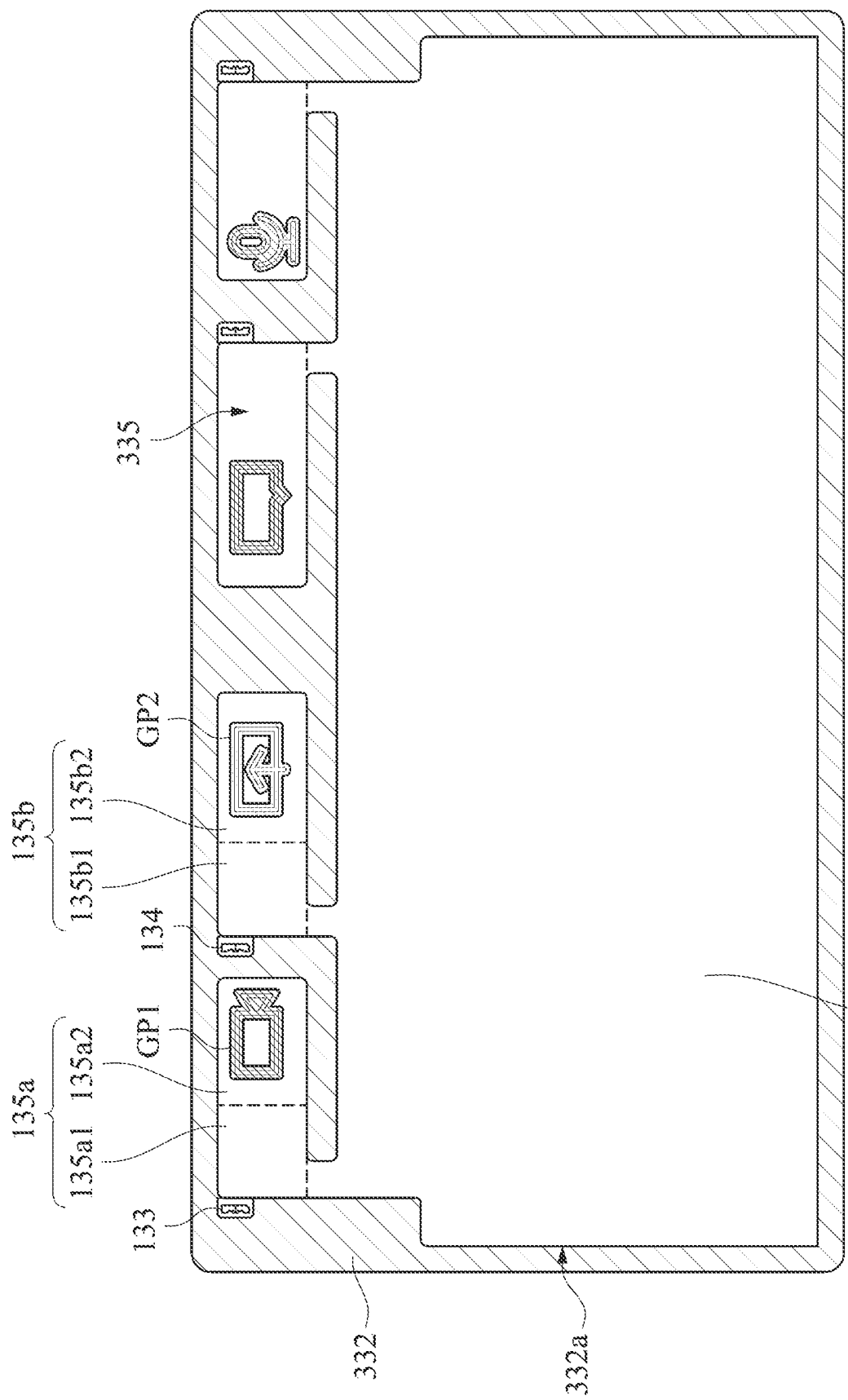
FIG. 6 is a front view of a light-shielding sheet and a light guide plate according to another embodiment of the disclosure.

Reference is made to FIG. 6. FIG. 6 is a front view of a light-shielding sheet 332 and a light guide plate 335 according to another embodiment of the disclosure. As shown in FIG. 6, in the present embodiment, the light-shielding sheet 332 has a hollow portion 332a. The hollow portion 332a has a closed contour. The light guide plate 335 is embedded in the hollow portion 332a. The light guide plate 335 includes a first light guide region 135a, a second light guide region 135b, and a connecting portion 335c, in which the first light guide region 135a and the second light guide region 135b are the same as or similar to those of the embodiment shown in FIG. 3, so reference can be made to the above related descriptions and will not be repeated here. A difference between the present embodiment and the embodiment shown in FIG. 3 is that the width of the connecting portion 335c in the present embodiment is larger than the width of the first light guide region 135a and the width of the second light guide region 135b (e.g., the widths in the vertical direction in FIG. 6).

In practical applications, a width of the connecting portion 135c may also be equal to the width of the first light guide region 135a and the width of the second light guide region 135b, which are not drawn here.

According to the foregoing recitations of the embodiments of the disclosure, it can be seen that in the backlight assembly of the present disclosure, the first light-emitting element and the second light-emitting element emit light toward the first light guide region and the second light guide region of the light guide plate, respectively. Moreover, the light guide plate is embedded in the hollow portion of the light-shielding sheet, and the light blocking portion of the light-shielding sheet is disposed between the first light guide region and the second light guide region. In this way, the light blocking portion of the light-shielding sheet can isolate the light emitted by the first light-emitting element and the second light-emitting element without interfering with each other, so that the first pattern and the second pattern on the cover plate can be displayed independently. In some embodiments, at least one of the first light-emitting element and the second light-emitting element is disposed on the wall surface of the hollow portion and configured to emit light toward the light blocking portion, or disposed on the wall surface of the light blocking portion and configured to emit light away from the light blocking portion. In some embodiments, the light guide plate has a connecting portion with two ends respectively connected to the first light guide region and the second light guide region, and the connecting portion has a bent portion. In this way, the light emitted by the first light-emitting element needs to go through more than two turns before reaching the second light guide region, or the light emitted by the second light-emitting element needs to go through more than two turns before reaching the first light guide region, thereby ensuring that the light emitted by the first light-emitting element and the second light-emitting element do not interfere with each other. Moreover, compared with separated light guide blocks, connecting the first light guide region and the second light guide region by the connecting portion as disclosed in the present embodiment can facilitate the assembly and alignment of the light guide plate.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A backlight assembly, comprising:
    a reflection sheet disposed on a circuit board and having a first through hole and a second through hole;
    a light-shielding sheet disposed on the reflection sheet and having a hollow portion, the hollow portion having a closed contour;
    a first light-emitting element and a second light-emitting element disposed on the circuit board, respectively accommodated in the first through hole and the second through hole, and located in the hollow portion;
    a light guide plate embedded in the hollow portion and comprising:
        a first light guide region having a first light mixing region and a first light outputting region, the first light-emitting element and the first light outputting region being respectively located on opposite sides of the first light mixing region; and
        a second light guide region having a second light mixing region and a second light outputting region, the second light-emitting element and the second light outputting region being respectively located on opposite sides of the second light mixing region; and
    a cover plate disposed above the light guide plate and the light-shielding sheet,
    wherein the light-shielding sheet further has a light blocking portion disposed between the first light guide region and the second light guide region, the first light outputting region and the second light outputting region respectively have a first light guide pattern and a second light guide pattern formed by a plurality of microstructures, a reflective layer is provided on a side of the cover plate facing the light guide plate, the cover plate further has a first pattern and a second pattern that are light transmissive and respectively correspond to the first light guide pattern and the second light guide pattern vertically, and the first light mixing region is defined by an overlapping region of an orthographic projection of the reflective layer projected on the first light guide region.

2. The backlight assembly of claim 1, wherein the second light mixing region is defined by an overlapping region of an orthographic projection of the reflective layer projected on the second light guide region.

3. The backlight assembly of claim 1, wherein a thickness of the light-shielding sheet is greater than a thickness of the light guide plate, a height of the first light-emitting element, and a height of the second light-emitting element.

4. The backlight assembly of claim 1, wherein at least one of the first light-emitting element and the second light-emitting element is disposed on a wall surface of the hollow portion, and is configured to emit light toward the light blocking portion.

5. The backlight assembly of claim 1, wherein at least one of the first light-emitting element and the second light-emitting element is disposed on a wall surface of the light blocking portion, and is configured to emit light away from the light blocking portion.

6. The backlight assembly of claim 1, wherein the light guide plate has a connecting portion, and two ends of the connecting portion are respectively connected to the first light guide region and the second light guide region.

7. The backlight assembly of claim 6, wherein the connecting portion has a zigzag shape.

8. The backlight assembly of claim 6, wherein the connecting portion has a bent portion.

9. The backlight assembly of claim 8, wherein the connecting portion is U-shaped.

10. The backlight assembly of claim 1, wherein a light outputting surface of the first light-emitting element has a first width, the first light mixing region is a portion within a first distance from a light incident surface of the first light guide region, and the first distance is at least about 1.5 times the first width.

11. The backlight assembly of claim 8, wherein a light outputting surface of the second light-emitting element has a second width, the second light mixing region is a portion within a second distance from a light incident surface of the second light guide region, and the second distance is at least about 1.5 times the second width.

12. A touchpad device, comprising:
    a circuit board; and
    a backlight assembly comprising:
        a reflection sheet disposed on the circuit board and having a first through hole and a second through hole;
        a light-shielding sheet disposed on the reflection sheet and having a hollow portion, the hollow portion having a closed contour;
        a first light-emitting element and a second light-emitting element disposed on the circuit board, respectively accommodated in the first through hole and the second through hole, and located in the hollow portion;
        a light guide plate embedded in the hollow portion and comprising:
            a first light guide region having a first light mixing region and a first light outputting region, the first light-emitting element and the first light outputting region being respectively located on opposite sides of the first light mixing region; and
            a second light guide region having a second light mixing region and a second light outputting region, the second light-emitting element and the second light outputting region being respectively located on opposite sides of the second light mixing region; and
        a cover plate disposed above the light guide plate and the light-shielding sheet,
        wherein the light-shielding sheet further has a light blocking portion disposed between the first light guide region and the second light guide region, the first light outputting region and the second light outputting region respectively have a first light guide pattern and a second light guide pattern formed by a plurality of microstructures, a reflective layer is provided on a side of the cover plate facing the light guide plate, the cover plate further has a first pattern and a second pattern that are light transmissive and respectively correspond to the first light guide pattern and the second light guide pattern vertically, and the first light mixing region is defined by an overlapping region of an orthographic projection of the reflective layer projected on the first light guide region.

* * * * *